United States Patent
Sneddon (10) Patent No.: US 10,363,946 B2
(45) Date of Patent: Jul. 30, 2019

(54) HYBRID PNEUMATIC REGENERATIVE SYSTEM FOR RAILWAY VEHICLES

(71) Applicant: Harris Corporation, Melbourne, FL (US)

(72) Inventor: Keith C. Sneddon, Sayville, NY (US)

(73) Assignee: Harris Corporation, Melbourne, FL (US)

(*) Notice: Subject to any disclaimer, the term of this patent is extended or adjusted under 35 U.S.C. 154(b) by 377 days.

(21) Appl. No.: 15/367,962

(22) Filed: Dec. 2, 2016

(65) Prior Publication Data

US 2018/0154911 A1   Jun. 7, 2018

(51) Int. Cl.
*B61C 7/04* (2006.01)
*B61C 7/02* (2006.01)
(Continued)

(52) U.S. Cl.
CPC ............ *B61C 7/04* (2013.01); *B60T 1/10* (2013.01); *B61C 7/02* (2013.01); *B61C 11/06* (2013.01);
(Continued)

(58) Field of Classification Search
CPC ............. B60K 8/00; B60K 2025/028; B60K 2006/123; B60K 6/12
See application file for complete search history.

(56) References Cited

U.S. PATENT DOCUMENTS 2,544,606 A * 3/1951 Marion ............... B60K 6/12
180/302
3,379,008 A * 4/1968 Manganaro ......... B60K 17/10
180/302
(Continued)

FOREIGN PATENT DOCUMENTS

CN  1053906 A   8/1991
EP  2886406 A1  6/2015
(Continued)

OTHER PUBLICATIONS

U.S. Appl. No. 13/043,091, filed Mar. 8, 2011 (Not Published).
(Continued)

*Primary Examiner* — Jason C Smith
(74) *Attorney, Agent, or Firm* — Edell, Shapiro & Finnan LLC (57) ABSTRACT

A pneumatic regenerative system for a railway vehicle equipped with a plurality of axles includes a plurality of pneumatic drive mechanisms coupled to each of the plurality of axles. Each pneumatic drive mechanism includes an accumulator and a pneumatic device. The pneumatic device may in some examples be a reversible air motor device. The accumulator is operable to receive and store pressurized air. The reversible air motor device is coupled to the accumulator and one of the plurality of axles of the vehicle. The reversible air motor device is operable in a first configuration and a second configuration. During a braking operation of the railway vehicle, the reversible air motor device in the first configuration is driven by rotation of the one of the plurality of axles to generate and store pressurized air in the accumulator. During an acceleration operation, of the railway vehicle the reversible air motor device receives pressurized air from the accumulator to drive rotation of the one of the plurality of axles.

20 Claims, 8 Drawing Sheets

(51) Int. Cl.
| | |
|---|---|
| B61C 11/06 | (2006.01) |
| B61C 17/06 | (2006.01) |
| B61C 15/00 | (2006.01) |
| F01B 25/24 | (2006.01) |
| F01B 17/02 | (2006.01) |
| F01B 23/02 | (2006.01) |
| B60T 1/10 | (2006.01) |
| B61H 9/06 | (2006.01) |
| F16D 61/00 | (2006.01) |

(52) U.S. Cl.
CPC .............. B61C 15/00 (2013.01); B61C 17/06 (2013.01); B61H 9/06 (2013.01); F01B 17/022 (2013.01); F01B 23/02 (2013.01); F01B 25/24 (2013.01); F16D 61/00 (2013.01)

(56) References Cited

U.S. PATENT DOCUMENTS

| | | | | |
|---|---|---|---|---|
| 3,513,929 A * | 5/1970 | Kim | ...................... | F02B 37/166 123/1 A |
| 3,612,202 A * | 10/1971 | Moon, Jr. | ................ | F16H 47/02 180/14.3 |
| 3,704,760 A * | 12/1972 | Maruyama | ............... | B60K 6/00 180/65.31 |
| 3,826,096 A * | 7/1974 | Hrusch | ...................... | F02C 6/06 60/656 |
| 3,986,575 A * | 10/1976 | Eggmann | ................. | B60K 3/04 180/302 |
| 4,123,910 A * | 11/1978 | Ellison, Sr. | ............. | B60K 3/00 180/302 |
| 4,132,283 A * | 1/1979 | McCurry | ................. | B60K 6/12 180/165 |
| 4,230,075 A * | 10/1980 | Lowther | ................... | F02B 3/08 123/39 |
| 4,355,508 A * | 10/1982 | Blenke | .................... | B60K 6/12 180/165 |
| 4,798,053 A * | 1/1989 | Chang | ..................... | B60K 6/12 180/165 |
| 5,460,239 A * | 10/1995 | Jensen | .................... | B60K 3/00 180/302 |
| 5,549,174 A * | 8/1996 | Reis | ......................... | B60K 6/12 180/165 |
| 5,724,811 A * | 3/1998 | Gibby | ....................... | F16H 39/01 60/409 |
| 5,847,470 A * | 12/1998 | Mitchell | .................. | B60K 6/00 290/45 |
| 5,853,229 A * | 12/1998 | Willmann | ................. | B60T 1/10 303/3 |
| 5,984,432 A * | 11/1999 | Otomo | .................... | B60T 7/042 303/119.2 |
| 6,044,924 A * | 4/2000 | Adli | ......................... | B60K 3/00 180/242 |
| 6,170,587 B1 * | 1/2001 | Bullock | .................... | B60K 6/12 180/69.6 |
| 6,311,797 B1 * | 11/2001 | Hubbard | ................... | B60K 3/00 180/165 |
| 6,353,786 B1 * | 3/2002 | Yamada | .................... | B60K 6/26 701/70 |
| 6,508,324 B1 * | 1/2003 | Conley, Jr. | .............. | B60K 6/12 180/165 |
| 7,147,078 B2 * | 12/2006 | Teslak | ....................... | B60K 6/12 180/305 |
| 7,461,626 B2 * | 12/2008 | Kimes | ...................... | B60K 6/12 123/245 |
| 8,013,567 B2 | 9/2011 | Windsor | | |
| 8,540,180 B2 | 9/2013 | Sobas | | |
| 8,862,356 B2 | 10/2014 | Miller | | |
| 9,234,530 B1 * | 1/2016 | Sneddon | ................. | F15B 1/025 |
| 9,816,378 B1 * | 11/2017 | Sneddon | ................. | F01B 25/00 |
| 9,855,835 B1 * | 1/2018 | Sneddon | ................. | B60K 3/00 |
| 2005/0279242 A1 | 12/2005 | Maier et al. | | |
| 2006/0000659 A1 * | 1/2006 | Teslak | ....................... | B60K 6/12 180/307 |
| 2006/0225941 A1 * | 10/2006 | Cole | ......................... | B60K 1/00 180/302 |
| 2007/0163819 A1 * | 7/2007 | Richter | .................... | B60K 6/48 180/65.245 |
| 2008/0251302 A1 * | 10/2008 | Lynn | ........................ | B60K 6/12 180/65.25 |
| 2008/0297103 A1 * | 12/2008 | Windsor | ............. | H01M 2/1072 320/101 |
| 2009/0301796 A1 * | 12/2009 | Wedderburn, Jr. | ...... | B60K 6/12 180/2.2 |
| 2010/0151989 A1 * | 6/2010 | Read | ......................... | B60K 6/12 477/4 |
| 2010/0270097 A1 * | 10/2010 | Prakash | ................ | B60C 23/003 180/165 |
| 2011/0011663 A1 * | 1/2011 | Hebrard | .................. | B60T 17/02 180/165 |
| 2011/0049909 A1 * | 3/2011 | Domes | ..................... | B60K 1/00 290/1 R |
| 2011/0062276 A1 * | 3/2011 | Sobas | .................... | E01C 19/522 242/557 |
| 2011/0156402 A1 * | 6/2011 | Khymych | .............. | B60K 16/00 290/55 |
| 2012/0325573 A1 * | 12/2012 | Miller | ....................... | B60L 7/24 180/282 |
| 2018/0154911 A1 * | 6/2018 | Sneddon | ................. | F01B 23/02 |

FOREIGN PATENT DOCUMENTS

| | | |
|---|---|---|
| EP | 3064409 A1 | 9/2016 |
| WO | 2004026657 A1 | 4/2004 |
| WO | 2014207757 A1 | 12/2014 |

OTHER PUBLICATIONS

U.S. Appl. No. 13/043,091—office action dated Feb. 7, 2013, USPTO.
U.S. Appl. No. 13/043,091—final office action dated Jun. 5, 2013, USPTO.
U.S. Appl. No. 13/043,091—office action dated Oct. 1, 2013, USPTO.
U.S. Appl. No. 13/043,091—final office action dated May 19, 2014, USPTO.
U.S. Appl. No. 13/043,091—office action dated Nov. 26, 2014, USPTO.
U.S. Appl. No. 13/043,091—final office action dated Jul. 20, 2015, USPTO.
U.S. Appl. No. 13/043,091—office action dated Jan. 15, 2016, USPTO.
U.S. Appl. No. 13/043,091—office action dated Oct. 25, 2016, USPTO.
TARDEC Quarterly, "Partnering with Industry and Academia", Warren, MI, Oct.-Dec. 2008 (40 pages).
Search Report in corresponding European Patent Application No. 17001920.2, dated May 9, 2018.

* cited by examiner

HYBRID PNEUMATIC REGENERATIVE SYSTEM FOR RAILWAY VEHICLES

FIELD OF THE INVENTION

The present invention relates to pneumatic-based regenerative systems. More specifically, the present invention relates to pneumatic-based regenerative system equipped for a railway vehicle, where the pneumatic-based regenerative system includes a plurality of pneumatic drive mechanisms disposed throughout the railway vehicle.

BACKGROUND

Regenerative vehicle power augmentation systems are typically applied to the start/stop cycles of vehicles to improve the overall fuel efficiency of the vehicle. A regenerative vehicle power augmentation system captures braking energy, which is otherwise released as heat into the environment, during a braking event of the vehicle, where the captured braking energy is then stored. The stored energy is later used to supplement engine power to assist in acceleration.

In recent years, hybrid electric vehicles have achieved commercial success in consumer automotive markets. This type of vehicle can improve overall energy efficiency by recapturing energy used by the vehicle's braking system, which is typically released to the environment as wasted energy for conventional (i.e., non-hybrid) vehicles. The captured energy is stored as electrical energy in batteries, which can be released to the drive system at appropriate times to reduce the load on the internal combustion engine of the vehicle. Certain types of hybrid electric vehicles can achieve economy improvements of 30% or more.

While hybrid electric vehicles have gained popularity for consumer vehicles (e.g., sedans, minivans, SUVs, etc.), such vehicles are limited in their ability to provide desirable fuel economies for larger and heavier vehicles, such as military vehicles, large package transport vehicles, and even railway vehicles. The high life-cycle cost associated with required battery replacements (and the resulting carbon footprint associated with disposing or recycling used batteries) as well as the larger and heavier battery that is required for larger and heavier vehicles makes a hybrid electric system undesirable for such vehicles. In addition, the limits in power delivery of battery systems also render the hybrid electric technology undesirable for use with vehicles that are larger and heavier in relation to typical consumer vehicles.

Vehicles equipped with hybrid hydraulic systems have also been utilized for motorized vehicles, in which a compressed gas is used to pump hydraulic fluid into a hydraulic motor to provide assistance to the combustion engine of the vehicle. However, there are environmental concerns with such systems, such as hydraulic fluid leakage, as well as economic costs associated with the additional weight and maintenance associated with such systems. In addition, the finite working volume of incompressible hydraulic fluid limits the speed of the drive circuit (due to viscous losses and heating), and limits the endurance and operating temperature of the system.

SUMMARY

In accordance with an example embodiment of the present invention, a hybrid pneumatic drive system for a railway vehicle is provided. The railway vehicle is equipped with a plurality of axles, and the pneumatic regenerative system includes a plurality of pneumatic drive mechanisms mechanically coupled to each of the plurality of axles. Each pneumatic drive mechanism includes an accumulator and a reversible air motor device. The accumulator is operable to receive and store pressurized air. The reversible air motor device is operably coupled to the accumulator and one of the plurality of axles of the railway vehicle. The reversible air motor device is operable in a first configuration and a second configuration. During a braking operation of the railway vehicle, the reversible air motor device in the first configuration is driven by rotation of the one of the plurality of axles to generate and store pressurized air in the accumulator. During an acceleration operation, the reversible air motor device receives pressurized air from the accumulator to drive rotation of the one of the plurality of axles.

BRIEF DESCRIPTION OF THE DRAWINGS

Like reference numerals have been used to identify like elements throughout this disclosure.

DETAILED DESCRIPTION

A hybrid pneumatic regenerative system for a railway vehicle comprises a plurality of hybrid pneumatic drive mechanisms disposed on a plurality of axles or plurality of wheels of the railway vehicle. Each hybrid pneumatic regenerative mechanism includes a pneumatic device that operates as both an air compressor and a pneumatic motor. The air compressor operation draws air from the environment and directs pressurized air to an air storage apparatus/accumulator during a braking operation of the vehicle, where the pressurized air is stored at a suitable elevated pressure (i.e., a pressure that is above the ambient air pressure or air pressure of the surrounding environment) until it is used. The accumulator of each hybrid pneumatic drive mechanism is capable of directing the stored pressurized air to the pneumatic device of each hybrid pneumatic drive mechanism when operating as a pneumatic motor, where the pressurize air is used as a working fluid for driving the pneumatic device of each hybrid pneumatic drive mechanism. Each pneumatic device is coupled with one of the axles of the railway vehicle to facilitate rotation of the axle to assist in propelling the railway vehicle. A main drive car, or locomotive, is often coupled to, and pulls, a plurality of rail cars (e.g., passenger cars, freight cars, etc.), where the main drive car and each of the rail cars includes a plurality of axles. The main drive car often includes a drive mechanism, or main drive engine, operatively coupled to the wheels or axles of the main drive car, which is used to drive the wheels of the main drive car, causing the main drive car to pull the plurality of rail cars. The pneumatic device of each hybrid pneumatic drive mechanism is operable in combination with the main drive engine to reduce the energy requirements of the main drive engine during acceleration of the railway vehicle.

The hybrid regenerative drive system of the present invention can be utilized with any types, makes, and models of railway vehicles including, without limitation, light rail, freight rail, high speed rail, etc. The railway vehicles include a main drive system (e.g., an internal combustion engine, external combustion engine, electrical engine, etc.) to power, accelerate, and propel the main drive car of the railway vehicle, as well as a braking system to decelerate or stop the railway vehicle. While railway vehicles typically having multiple cars (i.e., locomotive cars, rail cars, etc.), each of the cars of the railway vehicles, despite the type of car, includes multiple axles. It is noted that drive mechanisms (such as internal combustion engines, external combustion engines, electric motors, etc.) and braking systems (e.g., disk braking systems, rail braking systems, or any other suitable types of braking systems) are well known in the art of railway vehicles, and the present invention can be implemented with any such conventional types and/or other types of systems.

Figure 1:
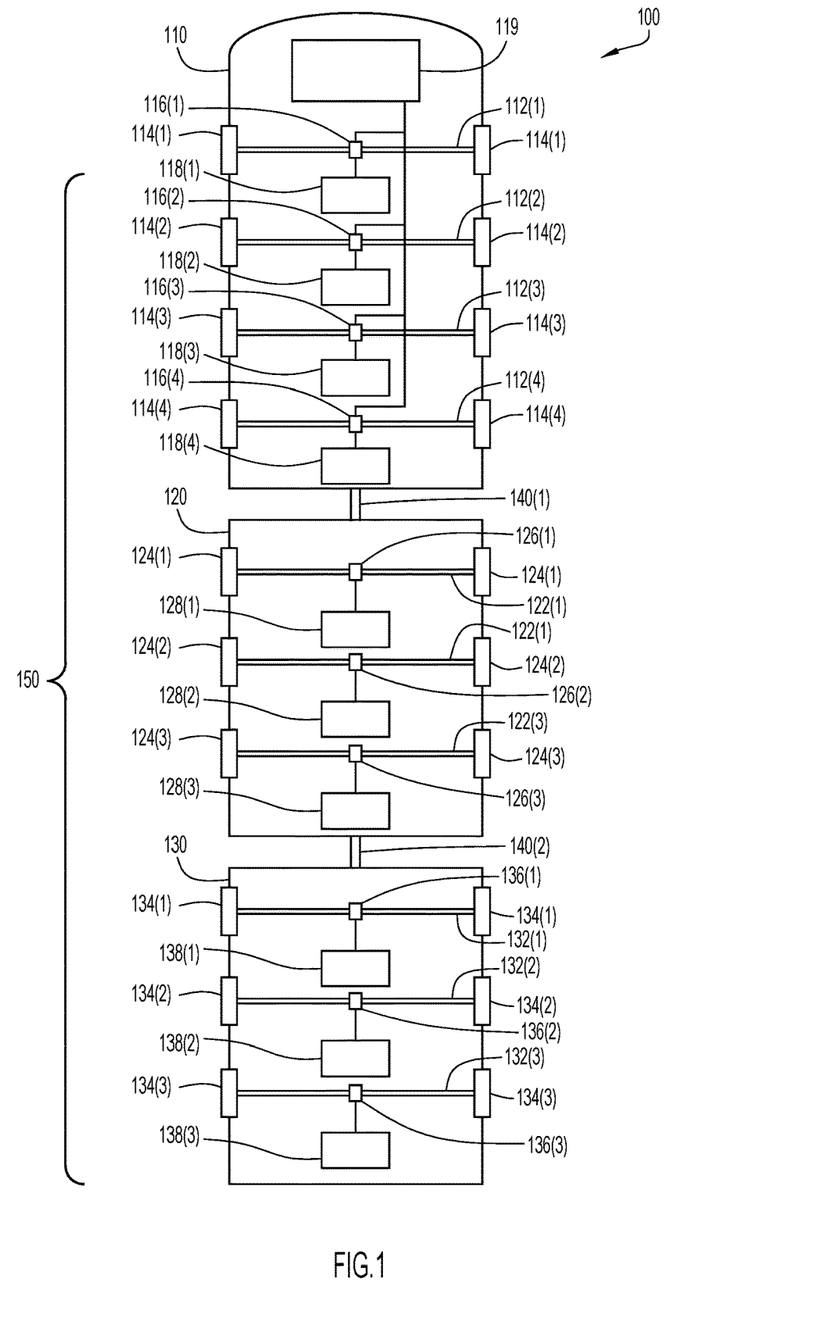
FIG. 1 is a schematic representation of a railway vehicle equipped with an exemplary embodiment of a hybrid pneumatic regenerative system in accordance with the present invention.

An exemplary embodiment of a hybrid pneumatic regenerative system in accordance with the present invention is illustrated in FIG. 1. As illustrated, the railway vehicle 100 includes a locomotive car 110, and a plurality of rail cars 120, 130. As illustrated in FIG. 1, the locomotive car 110 includes a plurality of axles 112(1), 112(2), 112(3), 112(4). Each of the plurality of axles 112(1), 112(2), 112(3), 112(4) includes a pair of wheels 114(1), 114(2), 114(3), 114(4), respectively. The pairs of wheels 114(1), 114(2), 114(3), 114(4) are coupled to the ends of each of the plurality of axles 112(1), 112(2), 112(3), 112(4) where the each of the pairs of wheels 114(1), 114(2), 114(3), 114(4) are spaced to fit upon a set of rails. The locomotive car 110 includes a main drive mechanism 119 that is operatively coupled to each of the plurality of axles 112(1), 112(2), 112(3), 112(4) where the main drive mechanism 119 (e.g., internal combustion engines, external combustion engines, electric motors, etc.) causes rotation of the plurality of axles 112(1), 112(2), 112(3), 112(4) and ultimately the pairs of wheels 114(1), 114(2), 114(3), 114(4) coupled to the plurality of axles 112(1), 112(2), 112(3), 112(4) respectively. In some embodiments the main drive mechanism 119 may be pinned to the wheels 114(1), 114(2), 114(3), 114(4) at an offset location to drive rotation of the wheels 114(1), 114(2), 114(3), 114(4). Thus, the main drive mechanism 119 powers the locomotive car 110 to drive the railway vehicle 100.

As further schematically illustrated in FIG. 1, disposed on each of the plurality of axles 112(1), 112(2), 112(3), 112(4) is a gear 116(1), 116(2), 116(3), 116(4). Coupled to each of the gears 116(1), 116(2), 116(3), 116(4) of the plurality of axles 112(1), 112(2), 112(3), 112(4) is a hybrid pneumatic drive mechanism 118(1), 118(2), 118(3), 118(4). As will be further described below, the hybrid pneumatic drive mechanisms 118(1), 118(2), 118(3), 118(4) are utilized to both store the braking energy of the axles 112(1), 112(2), 112(3), 112(4) during a braking event/braking operation and employ the stored energy to rotate the axles 112(1), 112(2), 112(3), 112(4) during an acceleration event/acceleration operation. Each of the hybrid pneumatic drive mechanisms 118(1), 118(2), 118(3), 118(4) may be capable of logically (electronically) or mechanically communicating with each other.

Continuing with FIG. 1, the plurality of rail cars 120, 130 are substantially similar to the locomotive car 110, except that the rail cars 120, 130 do not include a main drive mechanism 119. As illustrated in FIG. 1, a first coupler 140(1) couples the first rail car 120 to the locomotive car 110, while a second coupler 140(2) couples the second rail car 130 to the first rail car 120. The first rail car 120 includes a plurality of axles 122(1), 122(2), 122(3), where each of the plurality of axles 122(1), 122(2), 122(3) includes a pair of wheels 124(1), 124(2), 124(3), respectively. Furthermore, each of the axles 122(1), 122(2), 122(3) is equipped with a gear or gear mechanism 126(1), 126(2), 126(3). Similar to the wheels 114(1), 114(2), 114(3), 114(4) of the locomotive car 110, the pairs of wheels 124(1), 124(2), 124(3) of the first rail car 120 are coupled to the ends of each of the plurality of axles 122(1), 122(2), 122(3), where the each of the pairs of wheels 124(1), 124(2), 124(3) are spaced to fit upon a set of rails. As further schematically illustrated in FIG. 1, coupled to each of the gears 126(1), 126(2), 126(3) of the plurality of axles 122(1), 122(2), 122(3) is a hybrid pneumatic drive mechanism 128(1), 128(2), 128(3). The hybrid pneumatic drive mechanisms 128(1), 128(2), 128(3) of the first rail car 120 are substantially similar in both design and operation to the hybrid pneumatic drive mechanisms 118(1), 118(2), 118(3), 118(4) of the locomotive car 110. Furthermore, the hybrid pneumatic drive mechanisms 128(1), 128(2), 128(3) of the first rail car 120 may be capable of logically (electronically) or mechanically communicating with each other and with the hybrid pneumatic drive mechanisms 118(1), 118(2), 118(3), 118(4) of the locomotive car 110.

Substantially similar to the first rail car 120, the second rail car 130 includes a plurality of axles 132(1), 132(2), 132(3), where each of the plurality of axles 132(1), 132(2), 132(3) includes a pair of wheels 134(1), 134(2), 134(3), respectively. Similar to both the wheels 114(1), 114(2), 114(3), 114(4) of the locomotive car 110 and the wheels 124(1), 124(2), 124(3) of the first rail car 120, the pairs of wheels 134(1), 134(2), 134(3) of the second rail car 130 are coupled to the ends of each of the plurality of axles 132(1), 132(2), 132(3) and are spaced to fit upon a set of rails. Furthermore, each of the axles 132(1), 132(2), 132(3) is equipped with a gear or gear mechanism 136(1), 136(2), 136(3). As further schematically illustrated in FIG. 1, coupled to each of the gears 136(1), 136(2), 136(3) is a hybrid pneumatic drive mechanism 138(1), 138(2), 138(3). The hybrid pneumatic drive mechanisms 138(1), 138(2), 138(3) of the second rail car 130 are substantially similar in both design and operation to both the hybrid pneumatic drive mechanisms 118(1), 118(2), 118(3), 118(4) of the locomotive car 110, and the hybrid pneumatic drive mechanisms 128(1), 128(2), 128(3) of the first rail car 120. Furthermore, the hybrid pneumatic drive mechanisms 138(1), 138(2), 138(3) of the second rail car 130 may be capable of logically (electronically) or mechanically communicating with each other and with the hybrid pneumatic drive mechanisms 118(1), 118(2), 118(3), 118(4) of the locomotive car 110 and the hybrid pneumatic drive mechanisms 128(1), 128(2), 128(3) of the first rail car 120.

The hybrid pneumatic drive mechanisms 118(1), 118(2), 118(3), 118(4) of the locomotive car 110, the hybrid pneumatic drive mechanisms 128(1), 128(2), 128(3) of the first rail car 120, and the hybrid pneumatic drive mechanisms 138(1), 138(2), 138(3) of the second rail car 130 may collectively form the hybrid pneumatic regenerative system 150 of the railway vehicle 100. Each of the hybrid pneumatic drive mechanisms 118(1)-118(4), 128(1)-128(3), 138(1)-138(3) of the hybrid pneumatic regenerative system 150 may operate simultaneously and in unison with each other. By communicating, either logically or mechanically, with one another, the hybrid pneumatic drive mechanisms 118(1)-118(4), 128(1)-128(3), 138(1)-138(3) of the hybrid pneumatic drive system 150 may be configured to pneumatically and simultaneously provide the appropriate and optimized braking force to each of the axles 112(1)-112(4), 122(1)-122(3), 132(1)-132(3) of the cars 110, 120, 130 of the railway vehicle 100 to slow the railway vehicle 100, while concurrently storing the braking energy of the wheels 114(1)-114(4), 124(1)-124(3), 134(1)-134(3) and axles 112(1)-112(4), 122(1)-122(3), 132(1)-132(3). In addition, the hybrid pneumatic drive mechanisms 118(1)-118(4), 128(1)-128(3), 138(1)-138(3) of the hybrid pneumatic drive system 150 may be configured to simultaneously impart a driving force to the axles 112(1)-112(4), 122(1)-122(3), 132(1)-132(3) to cause the axles 112(1)-112(4), 122(1)-122(3), 132(1)-132(3) and the wheels 114(1)-114(4), 124(1)-124(3), 134(1)-134(3) to rotate.

While the railway vehicle 100 illustrated in FIG. 1 includes two rail cars 120, 130, other embodiments of the railway vehicle 100 may include any number of rail cars connected to the locomotive car 110.

Figure 2A:
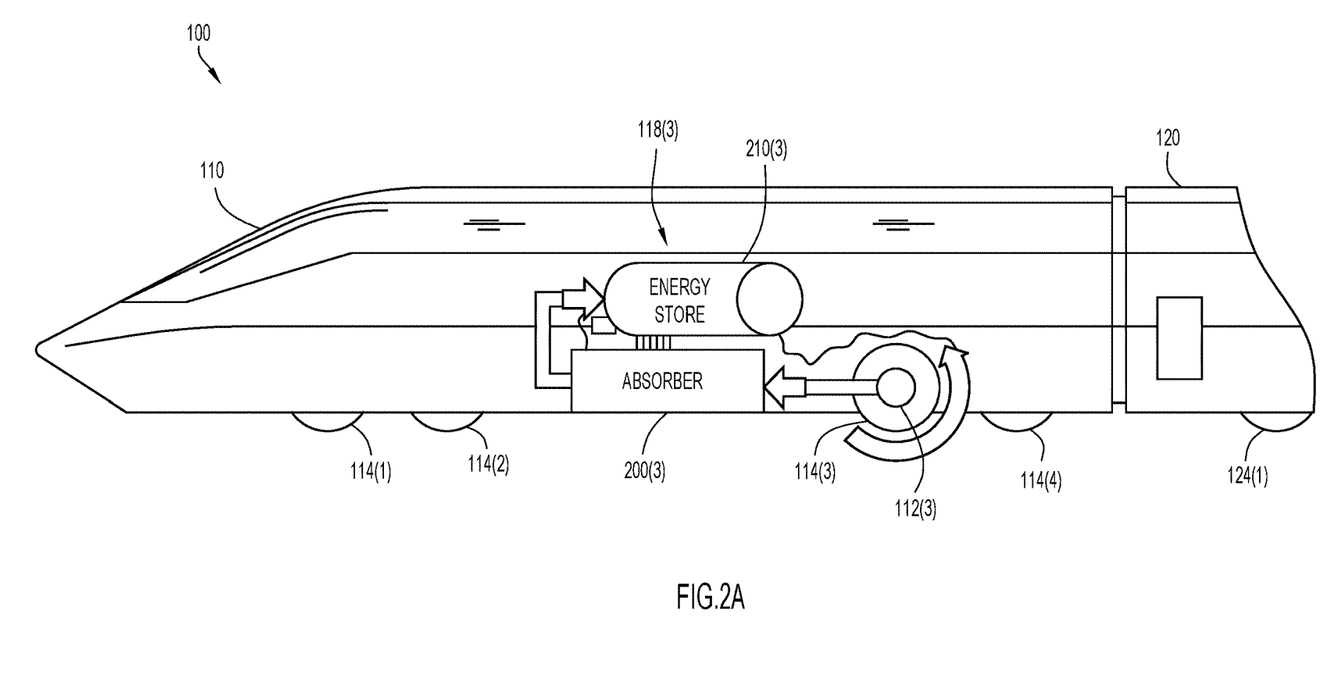
FIG. 2A is a schematic representation of a railway vehicle utilizing a first exemplary embodiment of a hybrid pneumatic regenerative system used to store energy during a braking event in accordance with the present invention.
Figure 2B:
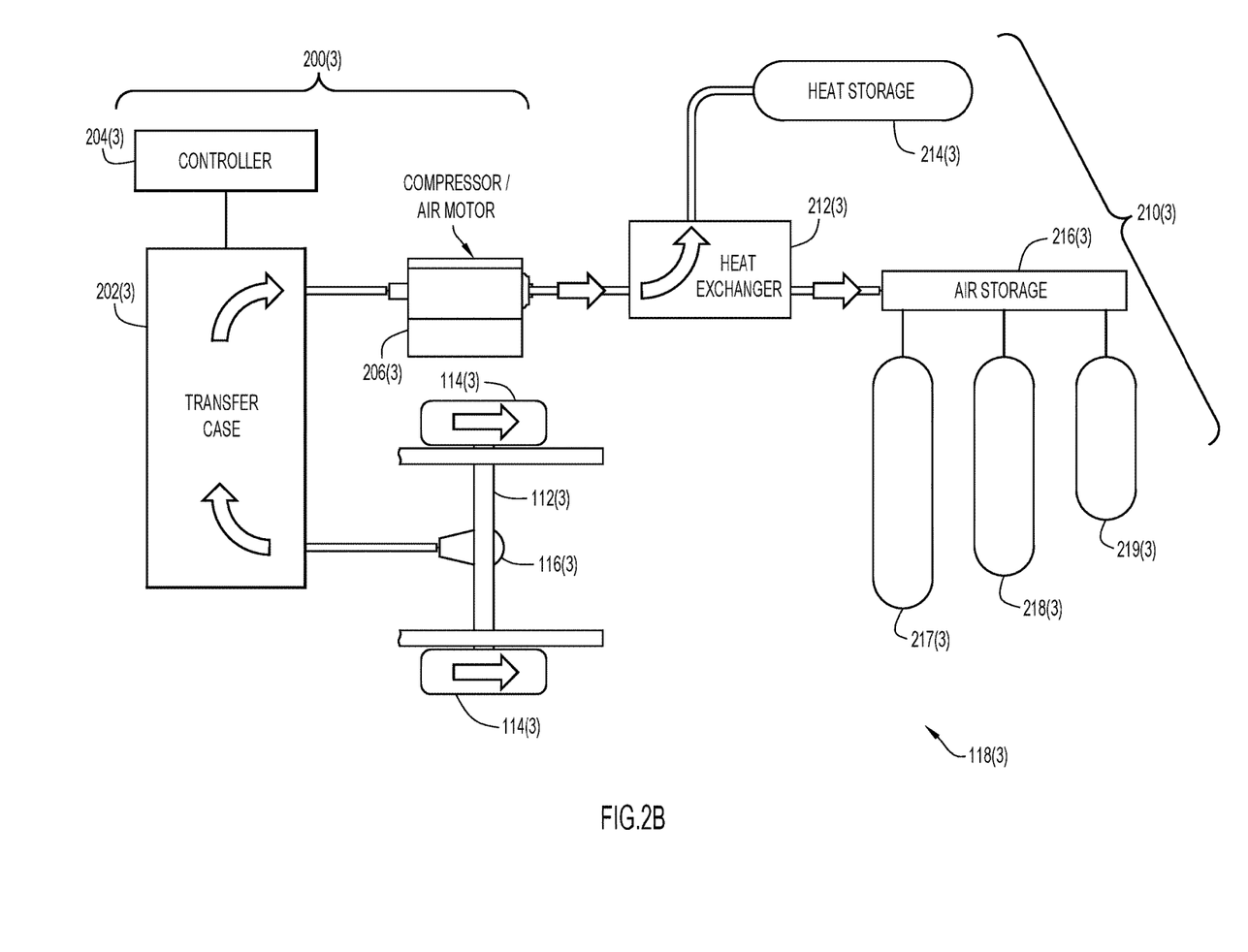
FIG. 2B is a schematic representation of a first exemplary embodiment of a hybrid pneumatic regenerative system used to store energy during a braking event in accordance with the present invention.

Turning to FIGS. 2A and 2B, illustrated is a schematic diagram of a braking event for a railway vehicle 100, and the operations performed by a first exemplary embodiment of one of the hybrid pneumatic drive mechanisms 118(3). FIGS. 2A and 2B illustrate a railway vehicle 100 with a locomotive car 110 and at least one rail car 120. As illustrated, the locomotive car 110 includes at least four pairs of wheels 114(1)-114(4), which, despite only axle 112(3) being illustrated, are coupled to axles 112(1)-112(4), respectively. The rail car 120 also includes at least one pair of wheels 124(1), which, while not illustrated, is coupled to an axle 122(1). While FIGS. 2A and 2B illustrate only the single hybrid pneumatic drive mechanism 118(3) coupled to the axle 112(3) of the pair of wheels 114(3) of the locomotive car 110, the discussion of FIGS. 2A and 2B applies to any of the hybrid pneumatic drive mechanisms 118(1)-118(4), 128(1)-128(3), 138(1)-138(3) of the hybrid pneumatic regenerative system 150 of the railway vehicle 100 illustrated in FIG. 1, since the hybrid pneumatic drive mechanisms 118(1)-118(4), 128(1)-128(3), 138(1)-138(3) of the hybrid pneumatic regenerative system 150 may all be substantially equivalent to one another. The operations of the hybrid pneumatic drive mechanisms 118(1)-118(4), 128(1)-128(3), 138(1)-138(3) may be utilized in conjunction with the brakes of the railway vehicle 100, or as the sole braking unit of the railway vehicle 100.

During a braking event or braking operation of the railway vehicle 100, the hybrid pneumatic drive mechanism 118(3) performs two main functions, absorbing the braking energy of the axle 112(3) via the absorber assembly 200(3), and storing the absorbed braking energy into an energy storage assembly 210(3). As illustrated in FIG. 2B, the absorber assembly 200(3) includes a transfer case 202(3), a controller 204(3), and a pneumatic device 206(3). The energy storage assembly 210(3) includes a heat exchanger 212(3), a heat storage apparatus 214(3), and an air storage apparatus 216(3). As illustrated, the transfer case 202(3) is operatively coupled to the gear, or set of gears, 116(3) of the axle 112(3). Thus, the transfer case 202(3) is indirectly coupled to the pair of wheels 114(3) of the axle 112(3). The transfer case 202(3) may contain a continuously variable transmission (CVT). The transfer case 202(3) is also operatively coupled to the pneumatic device 206(3). The pneumatic device 206(3) may be a multi-staged pneumatic device that can operate as either a compressor or a pneumatic motor (e.g., a four stage pneumatic device). The pneumatic device 206(3) operates as a compressor during a braking event, where the pneumatic device 206(3) draws air in, and compresses it and sends the compressed air to the air storage apparatus 216(3). Rotation of the pair of wheels 114(3), and thus the axle 112(3) and the gear 116(3), impart motion onto the transfer case 202(3). Motion imparted onto the transfer case 202(3) by rotation of the axle 112(3) is transferred by the transfer case 202(3) to the pneumatic device 206(3) to cause the pneumatic device 206(3) to operate as a compressor and draw air from the environment surrounding the railway vehicle through the pneumatic device 206(3) to be compressed and stored at a high pressure in the energy storage assembly 210(3). As used herein, the term "pressurized air" refers to air that is at a pressure which is greater than the pressure of air in the ambient or surrounding environment for the railway vehicle 100. The controller 204(3) is logically connected to the transfer case 202(3) and is configured to manage and regulate the CVT of the transfer case 202(3). In addition, the controller 204(3) is configured to receive a brake request (i.e., depressing a brake pedal, pulling of a brake lever, etc.) from the operator of the railway vehicle 100, as well as calculate the amount of pressure disposed within the air storage apparatus 216(3) at any given time, and the speed of the railway vehicle 100 at any given time.

Based on the magnitude of brake force requested, the amount of pressure in the air storage apparatus 216(3) and the railway vehicle speed, the controller 204(3) calculates the total braking capacity of the hybrid pneumatic drive mechanism 118(3), activates hybrid pneumatic drive mechanism 118(3), and diverts any excess braking energy (not capable of being absorbed by the pneumatic device 206(3)) to a conventional brake system of the railway vehicle 100. Upon activation of the hybrid pneumatic drive mechanism 118(3), the controller 204(3) further regulates the CVT of the transfer case 202(3) based on the rotational speed of the axle 112(3) and the calculated braking force to cause the pneumatic device 206(3) to absorb the kinetic energy of the railway vehicle 100. In other words, the pneumatic device 206(3) draws in air from the environment surrounding the railway vehicle 100 and compresses the air. The controller 204(3) regulates the CVT of the transfer case 202(3) to maintain the pneumatic device 206(3) at as close to optimal speed as possible to dispose the compressed air into the energy storage assembly 210(3) until the maximum pressure of the air storage apparatus 216(3) is reached.

As previously explained, the energy storage assembly 210(3) includes a heat exchanger 212(3), a heat storage apparatus 214(3), and an accumulator/air storage apparatus 216(3). The pneumatic device 206(3) is coupled to the heat exchanger 212(3) such that the pneumatic device 206(3) and the heat exchanger 212(3) are in fluid communication with the heat exchanger 212(3). Furthermore, the heat exchanger 212(3) is in fluid communication with the air storage apparatus 214(3), and is in thermal communication with the heat storage apparatus 214(3). As the pneumatic device 206(3) pulls in air, the compressed air is pumped into the heat exchanger 212(3). The heat exchanger 212(3) operates, after each completed cycle of the pneumatic device 206(3), to extract heat from the air that is compressed by the pneumatic device 206(3) and store the heat within the heat storage apparatus 214(3). The heat exchanger 212(3) is configured store the extracted heat in a body of water disposed within the heat storage apparatus 214(3). In one embodiment, the heat exchanger 212(3) is configured to decrease the temperature of the air to approximately 100 degrees Fahrenheit, while increasing the temperature of the body of water disposed within the heat storage apparatus 214(3) to at, or above, the boiling point of the water (e.g., 212 degrees Fahrenheit). The air pumped into the heat exchanger 212(3) by the pneumatic device 206(3) is further pumped from the heat exchanger 212(3) to the air storage apparatus 216(3) after the heat has been extracted from the air. The air storage apparatus 216(3) illustrated in FIG. 2B includes three air storage tanks 217(3), 218(3), 219(3), where the first tank 217(3) is the largest of the tanks 217(3), 218(3), 219(3), the third tank 219(3) is the smallest of the tanks 217(3), 218(3), 219(3), and the second tank 218(3) is smaller than the first tank 217(3) but larger than the third tank 219(3). Thus, the first tank 217(3) is capable of storing a larger volume of air than the other tanks 218(3), 219(3). Moreover, the storage tanks 217(3), 218(3), 219(3) are capable of storing air up to 8,000 psig (about 55.16 MPa) or even greater. Other embodiments of the air storage apparatus 216(3) may contain any number of air storage tanks.

As pressure is built up within the air storage apparatus 216(3), and the air disposed within the air storage apparatus 216(3) approaches its maximum pressure, the operational speed of the pneumatic device 206(3) slows, which, in turn, imparts a drag on the rotational speed of the axle 112(3) and the wheels 114(3) via the transfer case 202(3). Furthermore, the controller 204(3) can further serve to slow the rotational speed of the 112(3) and the wheels 114(3) by regulating and altering the CVT based on the operational speed of the pneumatic device 206(3) and the calculated braking force magnitude of the locomotive car 110. The controller 204(3), in performing this function, may also take into consideration the current pressure of the air storage apparatus 216(3) relative to the maximum pressure of the air storage apparatus 216(3), as well as the current speed or velocity of the railway vehicle 100. When each pneumatic device mechanism 118(1)-118(4), 128(1)-128(3), 138(1)-138(3) imparts this drag onto their respective axles, the speed or velocity of the railway vehicle 100 is reduced. In the event that the air storage apparatus 216(3) reaches its maximum pressure before the railway vehicle decelerates to the desired or intended speed, the remaining or excess braking force that is required to achieve the complete the braking operation is provided by the conventional brake system (e.g., a disk brake system) for the railway vehicle 100.

Figure 3A:
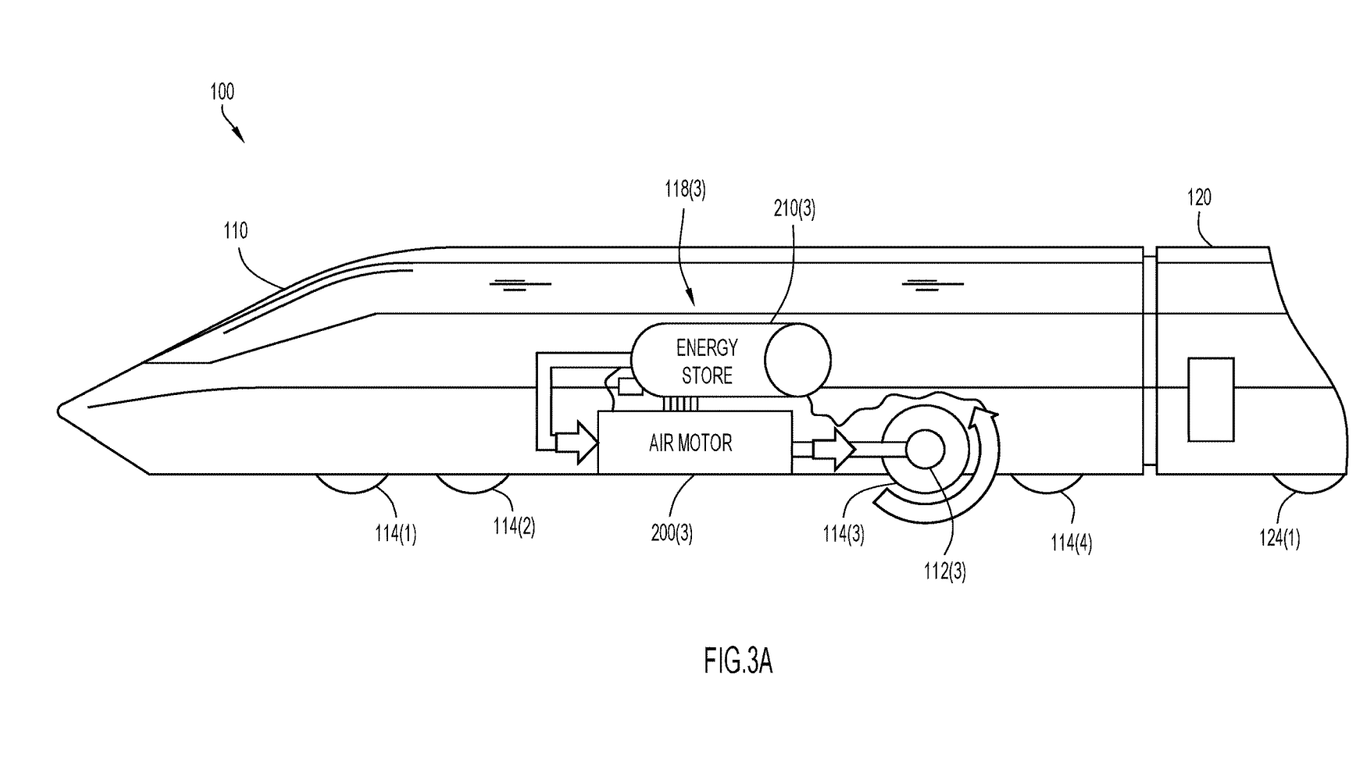
FIG. 3A is a schematic representation of a railway vehicle utilizing a first exemplary embodiment of a hybrid pneumatic regenerative system to employ the stored energy for an acceleration event in accordance with the present invention.
Figure 3B:
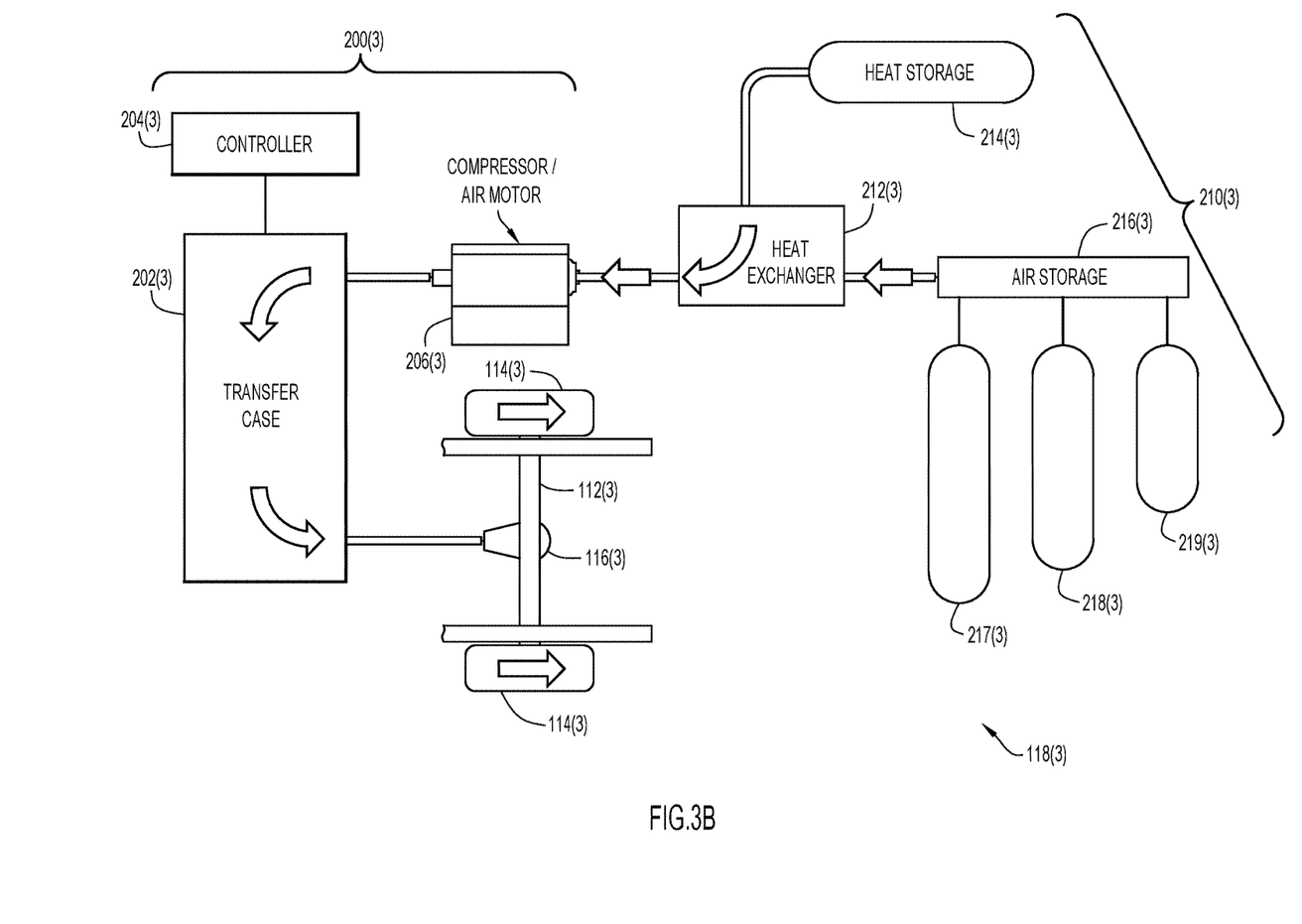
FIG. 3B is a schematic representation of a first exemplary embodiment of a hybrid pneumatic regenerative system used to employ stored energy during an acceleration event in accordance with the present invention.

Turning to FIGS. 3A and 3B, illustrated is a schematic diagram of an acceleration event for a railway vehicle 100 in accordance with the present invention, and the operations performed by the high level components of one of the hybrid pneumatic drive mechanisms 118(3). Similar to FIGS. 2A and 2B, FIGS. 3A and 3B illustrate a railway vehicle 100 with a locomotive car 110 and at least one rail car 120. As illustrated, the locomotive car 110 includes at least four pairs of wheels 114(1)-114(4), which, despite only axle 112(3) being illustrated, are coupled to axles 112(1)-112(4), respectively. The rail car 120 also includes at least one pair of wheels 124(1), which, while not illustrated, is coupled to an axle 122(1). While FIGS. 3A and 3B illustrate only the hybrid pneumatic drive mechanism 118(3) coupled to the axle 112(3) of the pair of wheels 114(3) of the locomotive car 110, the discussion of FIGS. 3A and 3B, like that of FIGS. 2A and 2B, applies to any of the hybrid pneumatic drive mechanisms 118(1)-118(4), 128(1)-128(3), 138(1)-138(3) of the hybrid pneumatic regenerative system 150 of the railway vehicle 100 illustrated in FIG. 1, since the hybrid pneumatic drive mechanisms 118(1)-118(4), 128(1)-128(3), 138(1)-138(3) of the hybrid pneumatic regenerative system 150 may all be substantially equal to one another. The operations of the hybrid pneumatic drive mechanisms 118(1)-118(4), 128(1)-128(3), 138(1)-138(3) of the railway vehicle 100 may be utilized in conjunction with the main drive mechanism 119 of the locomotive car 110 to accelerate the railway vehicle 100.

During an acceleration event or acceleration operation, the hybrid pneumatic drive mechanism 118(3) performs two main functions, releasing the absorbed braking energy from the energy storage assembly 210(3), and applying the previously absorbed braking energy to the axle 112(3) via the air motor assembly 200(3) to drive rotation of the axle 112(3). The absorber assembly 200(3) of the braking event and the air motor assembly 200(3) of the acceleration event are the same assembly and are constructed of the same components. In fact, the pneumatic device 206(3) of the absorber assembly 200(3) may be run in reverse, mechanically changing from a compressor to an air motor. Thus, as illustrated in FIG. 3B, the air motor assembly 200(3) includes the transfer case 202(3), the controller 204(3), and the pneumatic device 206(3). Furthermore, as previously explained with regard to FIG. 2B, the energy storage assembly 210(3) includes the heat exchanger 212(3), the heat storage apparatus 214(3), and the air storage apparatus 216(3). As explained previously, the transfer case 202(3) is operatively coupled to the gear, or set of gears, 116(3) of the axle 112(3) and the pneumatic device 206(3), where the transfer case 202(3) contains a continuously variable transmission (CVT). The pneumatic device 206(3) operates as an air motor 206(3) during an acceleration event, where the pneumatic device 206(3) draws pressurized air from the air storage apparatus 216(3) to impart rotation onto the axle 112(3) via the transfer case 202(3).

When the operator of the railway vehicle 100 commands an acceleration of the railway vehicle 100, a signal is sent to the controller 204(3) which is translated to a torque command. Based on the available energy (pressure, volume, temperature) stored within the energy storage assembly 210(3), the pneumatic device 206(3) is activated via the opening of the tanks 217(3), 218(3), 219(3) of the air storage apparatus 216(3). The regulated high pressure air is transferred from the air storage apparatus 216(3) to the heat exchanger 212(3), which heats the regulated high pressure air with the heat stored within the heat storage apparatus 214(3). The heated high pressure air is then fed to the pneumatic device 206(3) prior to the start of each cycle of the pneumatic device 206(3). The pneumatic device 206(3) expands the heated high pressure air and delivers power to rotate the axle 112(3) via the transfer case 202(3). The now expanded and low pressure air may be discharged by the pneumatic device 206(3) to the environment surrounding the railway vehicle 100. The controller 204(3) regulates and alters the CVT of the transfer case 202(3) to enable the power output by the pneumatic device 206(3) to rotate the axle 112(3) with the optimal rotational speed. In the event that the torque requested by the operator of the railway vehicle 100 is above that which the air motor can supply, the main drive mechanism 119 may be configured to supply the torque deficit to the axles 112(1)-112(4) of the locomotive car 110. However, only the hybrid pneumatic drive mechanisms 128(1)-128(3), 138(1)-138(3) are capable of imparting a torque, or force to rotate, the axles 122(1)-122(3), 132(1)-132(3) of the rail cars 120, 130. After the tanks 217(3), 218(3), 219(3) of the air storage apparatus 216(3) are depleted, the hybrid pneumatic drive mechanism 118(3) lies dormant until the next braking event/operation when the hybrid pneumatic drive mechanism 118(3) may collect braking energy (and thus, pressurized air) for the next acceleration event/operation.

Figure 4:
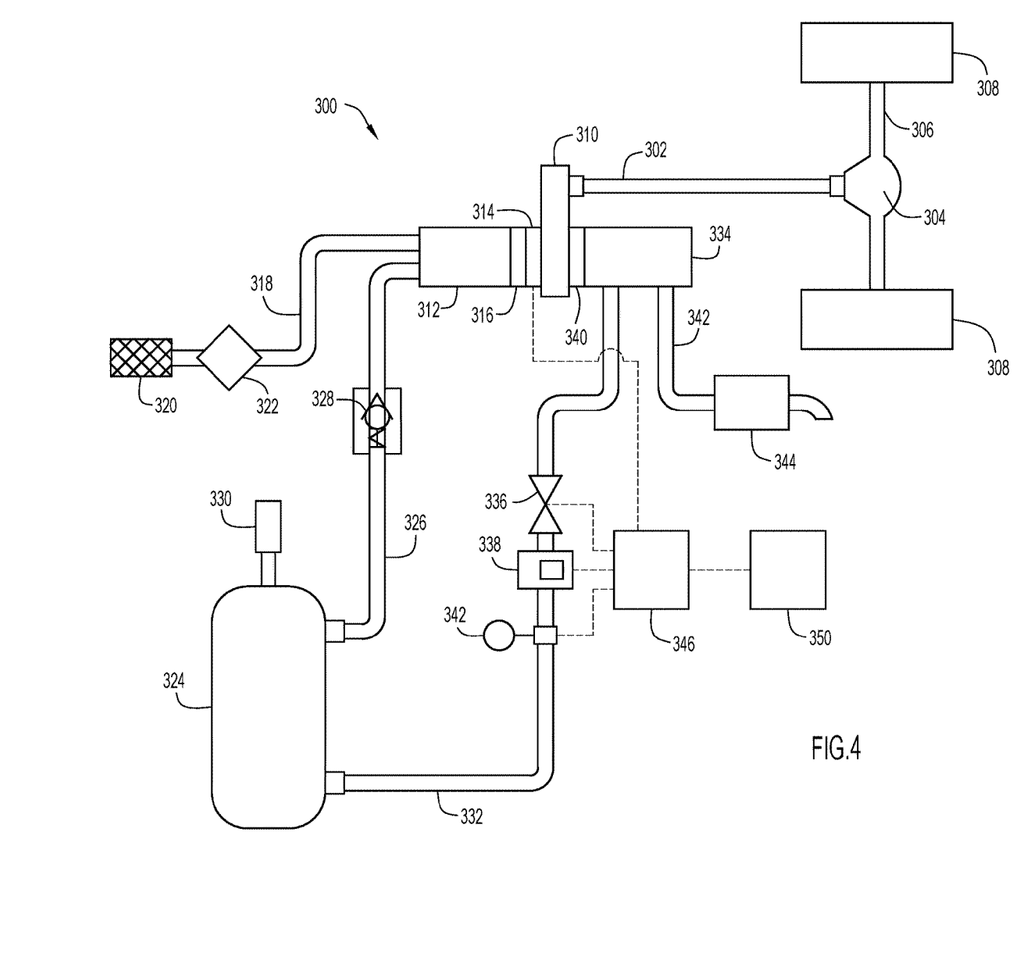
FIG. 4 is a detailed schematic representation of a second exemplary embodiment of a hybrid pneumatic drive system for use with each axle of a railway vehicle in accordance with the present invention.

Referring to FIG. 4, illustrated is a detailed schematic diagram of a second exemplary embodiment of a hybrid pneumatic drive mechanism 300 in accordance with the present invention. The hybrid pneumatic drive mechanism 300 may represent any of the hybrid pneumatic drive mechanisms 118(1)-118(4), 128(1)-128(3), 138(1)-138(3) illustrated in FIG. 1. As illustrated in FIG. 4, hybrid pneumatic drive mechanism 300 is shown connected, via a drive shaft 302, to a gearing mechanism 304 coupled to a solid axle 306. Coupled to each end of the solid axle 306 is a pair of wheels 308 of railway vehicle 100, where rotation of the wheels 308 causes rotation of the drive shaft 302, or vice versa, via the mechanical coupling of the drive shaft 302 to the gear mechanism 304 of the axle 306. Thus, rotation of the drive shaft 302 is configured to provide power and rotational energy to the wheels 308 to aid in propelling the vehicle. As previously noted, the railway vehicle 100 may be constructed so that each axle of the railway vehicle 100, or at least a plurality of the axles of the railway vehicle 100, are equipped with a hybrid pneumatic drive mechanism 300. While the drive shaft 302 shown in FIG. 4 is shown as providing power to one pair of wheels 308, it is noted that the hybrid pneumatic regenerative system 150 may consist of a plurality of hybrid pneumatic drive mechanisms 300 that are designed to provide drive power to their respective wheels 308 of the railway vehicle 100. It is further noted that the railway vehicle 100 includes a main braking system (e.g., disk braking systems, rail braking systems, etc.) that is implemented on any selected number of wheels of the railway vehicle 100 to decelerate or stop the vehicle 100. The main braking system is not shown in FIG. 4 for ease of reference. An example embodiment of a railway vehicle 100 with which the multiple hybrid pneumatic drive mechanisms 300 can be implemented is the railway vehicle 100 shown in FIG. 1.

The pneumatic drive portion of mechanism 300 includes an air compressor 312 that is coupled with the drive shaft 302 via a transfer case 310, an electromechanical clutch 314, and a continuously variable transmission (CVT) 316. In particular, the clutch 314, via an electrical actuating mechanism (e.g., a solenoid), is provided to selectively engage and disengage a drive shaft of the compressor connected with the CVT 316 with the drive shaft 302 within the transfer case 310. When engaged with the drive shaft 302, the CVT 316 converts the power of the drive shaft 302 to an appropriate drive power for the air compressor 312 (e.g., via suitable gearing ratio within the CVT 316). This facilitates operation of the compressor 312 to draw air in from the external environment surrounding the railway vehicle 100 and compress/pressurize the air to a selected pressure. Air is drawn into the compressor 312 via an air intake conduit 318. An intake screen 320 is disposed at the inlet end of the air intake conduit 318, and an air filter 322 is disposed within the conduit 318 at a location downstream from the intake screen 320. Both the intake screen 320 and air filter 322 provide a suitable filtration of the intake air (e.g., removing particulate matter of selected dimensions from the air) prior to the intake air entering the compressor 312.

The pneumatic drive portion further includes an air storage apparatus, or accumulator, 324 comprising at least one high pressure tank that receives pressurized air from the compressor 312, via a pressurized air conduit 326. A check valve 328 is provided within the air conduit 326 to prevent any backflow of air from the air conduit 326 back to the compressor 312. In addition, a pressure regulator can be provided within the air conduit 326 to control the pressure and flow of air prior to entry within the accumulator 324. The accumulator 324 also includes a relief valve 330 that controls the pressure within the accumulator 324 (e.g., by releasing pressurized air from the accumulator 324 to the external environment when the pressure within the accumulator 324 exceeds an upper limit value).

Although the accumulator 324 is depicted in FIG. 4 as a single tank, it is noted that the accumulator 324 can alternatively comprise a plurality of tanks arranged in parallel or in series within the pneumatic drive portion of the mechanism 300, as illustrated in FIGS. 2B and 3B. The accumulator 324 is designed to accommodate and store the pressurized air received from the air compressor 312. As previously explained, the term "pressurized air" refers to air that is at a pressure which is greater than the pressure of air in the ambient or surrounding environment for the railway vehicle 100. In particular, the accumulator 324 can store pressurized air at pressures of at least about 500 psig (about 3.447 MPa) or greater for use in operation of the pneumatic drive portion of the mechanism 300. For example, during operation, the compressor 312 can provide pressurized air to the accumulator 324, with the accumulator 324 storing pressurized air at pressures as large as about 6,000 psig (about 41.37 MPa) to about 8,000 psig (about 55.16 MPa) or even greater.

Another pressurized air conduit 332 connects an outlet of the accumulator 324 with an inlet of a pneumatic motor 334. Disposed within the air conduit 332 is an electromechanical valve 336 that is electrically controlled (e.g., via a solenoid actuator) to control the flow of pressurized air from the accumulator 324 to the pneumatic motor 334. A pressure regulator 338 is also provided within the air conduit 332 to control the pressure and flow of pressurized air to the pneumatic motor 334.

The pneumatic motor 334 receives the pressurized air from the accumulator 324 and allows the air to expand to generate mechanical energy, which rotates an output shaft of the motor 334. The output shaft of the pneumatic motor 334 is coupled, via a one-way or sprag clutch 340, to a suitable connection within the transfer case 310 that is also coupled with the drive shaft 302. The sprag clutch 340 frictionally engages with the connection within the transfer case 310 when the output shaft of the motor 334 rotates in one direction, and the sprag clutch 340 disengages or free wheels with the connection in the transfer case 310 when the output shaft of the motor 334 is stationary. Thus, the pneumatic motor 334 delivers rotary drive power to the drive shaft 302 by expansion of pressurized air received from the accumulator 324. The expanded air exits the motor 334 via an exhaust conduit 342 and muffler 344.

An electronic control unit (ECU) or controller 346 is provided to control operation of the pneumatic drive portion of the mechanism 300 by controlling the electromechanical clutch 314 (which couples the compressor 312 to the drive shaft 302) and the electromechanical valve 336 (which provides pressurized air flow from the accumulator 324 to the inlet of the pneumatic motor 334). The controller 346 is coupled with the clutch 314 and the valve 336, as well as one or more sensors provided within the accumulator 324 and/or at other locations within the pneumatic drive portion. In particular, one or more pressure sensors as well as any other types of sensors (e.g., temperature sensors) are provided to measure the pressure and/or amount of pressurized air that is stored within the accumulator 324 and/or flowing through the air conduit 332 at any given time. As shown in FIG. 4, a pressure sensor 348 is provided in the air conduit 332 proximate the outlet of the accumulator 324. However, the mechanism 300 can include any other pressure and/or other types of sensors at other locations (e.g., to measure pressure and/or temperature within the accumulator). The controller 346 is also coupled with the pressure regulator 338 so as to control operation of the regulator 338 in order to further control the pressure and flow of air to the pneumatic motor 334.

The controller 346 is coupled with the sensor(s) (represented by sensor 348), regulator 338, clutch 314 and valve 336 via any suitable wireless or hardwire connection. In addition, the controller 346 is coupled (via a wireless or hardwire connection) with the accelerator and brake actuators of the railway vehicle 100 (represented generally as box 350 in FIG. 4). One or more suitable position and/or any other types of displacement sensors are connected with the accelerator and brake actuators 350 and coupled with the controller 346 to provide the controller with an indication of the amount of braking force or the acceleration force requested during operation (e.g., the braking or acceleration force can be determined as proportionate to the amount or degree of displacement of the brake or acceleration pedal that is pressed by the user or operator of the railway vehicle 100).

The controller 346 includes a processor with suitable logic that facilitates control of the hybrid pneumatic mechanism 300 based upon the braking and power requirements of the railway vehicle 100 during operation. The controller 346 can also include a memory module to store data acquired from the sensors and/or any other types of information, including control algorithms to be implemented by the processor during operation of the railway vehicle 100.

The braking and acceleration operations for the hybrid pneumatic drive mechanism 300 are now described with reference to the example process flow charts depicted in FIGS. 5 and 6. As previously explained, the detailed schematic diagram of the hybrid pneumatic drive mechanism 300 illustrated in FIG. 4 is a representation of each of the mechanisms 118(1)-118(4), 128(1)-128(3), 138(1)-138(3) illustrated in FIG. 1. Thus, the hybrid pneumatic regenerative system 150 illustrated in FIG. 1 comprises a plurality of hybrid pneumatic drive mechanisms 300, each being mechanically coupled to an axle 112(1)-112(4), 122(1)-122(3), 132(1)-132(3) of the cars 110, 120, 130 of the railway vehicle 100, regardless of which car 110, 120, 130 contains the main drive mechanism 119. At the start of operation of the railway vehicle 100, the accumulator 324 of each mechanism 300 may be empty or filled to some level (e.g., partially filled or filled to capacity) with pressurized air (e.g., the accumulator 324 may contain some amount of pressurized air that was accumulated during a previous use of the railway vehicle 100). Each of the pneumatic drive mechanisms 300 of the system 150 may be configured to communicate with one another, either logically or mechanically, so that each mechanism 300 operates concurrently with the other mechanisms 300 of the system 150. Operation of the system 150 is initiated when a user/operator starts an ignition for the railway vehicle 100 to initiate operation of the main drive mechanism 119. The railway vehicle 100 proceeds to travel at a selected velocity. When the user/operator decides to initiate a braking operation of the railway vehicle 100, the controller 346 of each mechanism 300 of the system 150 determines whether to "charge" the accumulator 324 of that respective mechanism 300 with pressurized air.

Figure 5:
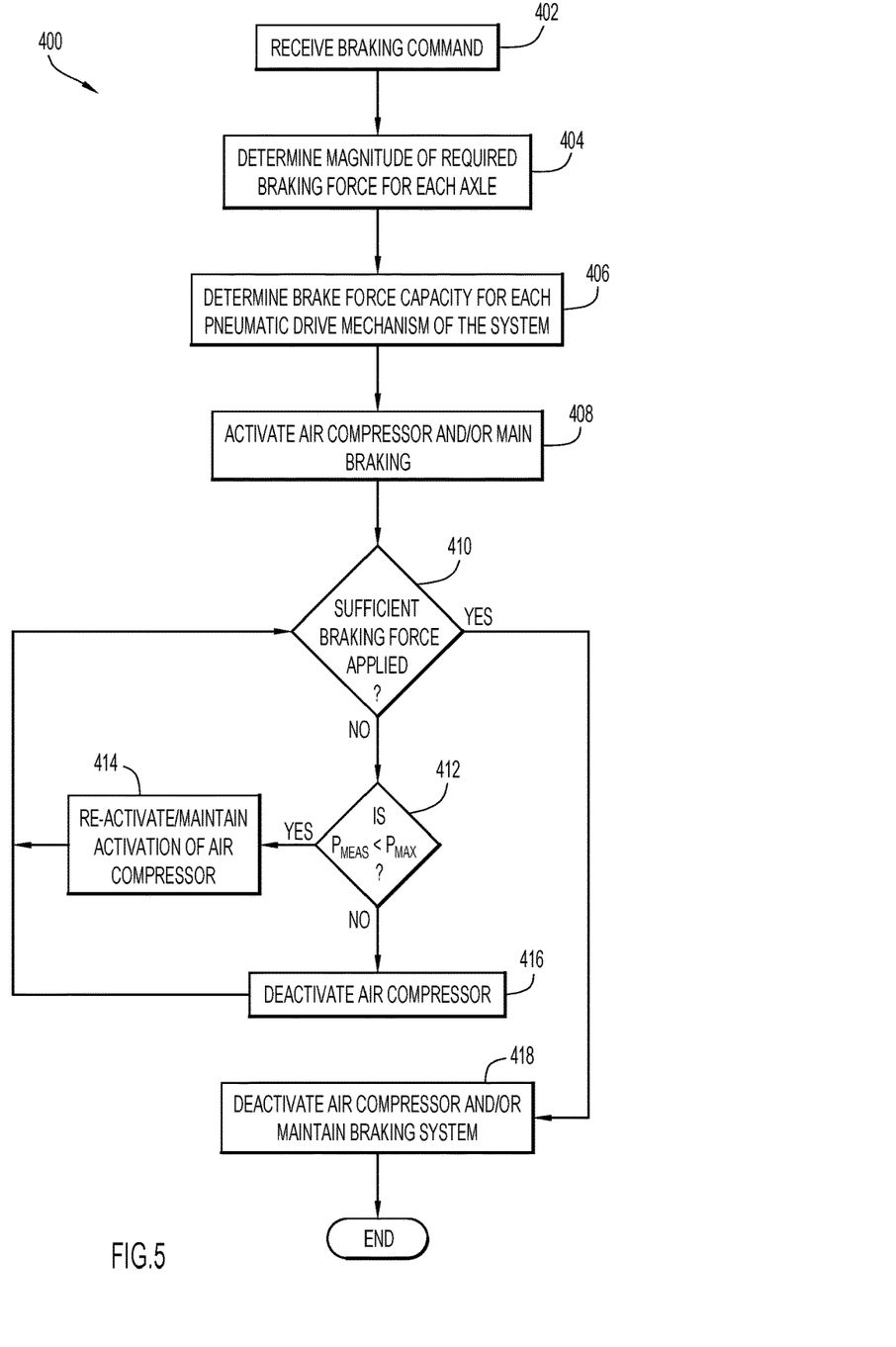
FIG. 5 is flow chart of a method of utilizing the hybrid pneumatic regenerative system of FIG. 1 during a braking operation of a railway vehicle in accordance with the second exemplary embodiment of the invention illustrated in FIG. 4.
Figure 6:
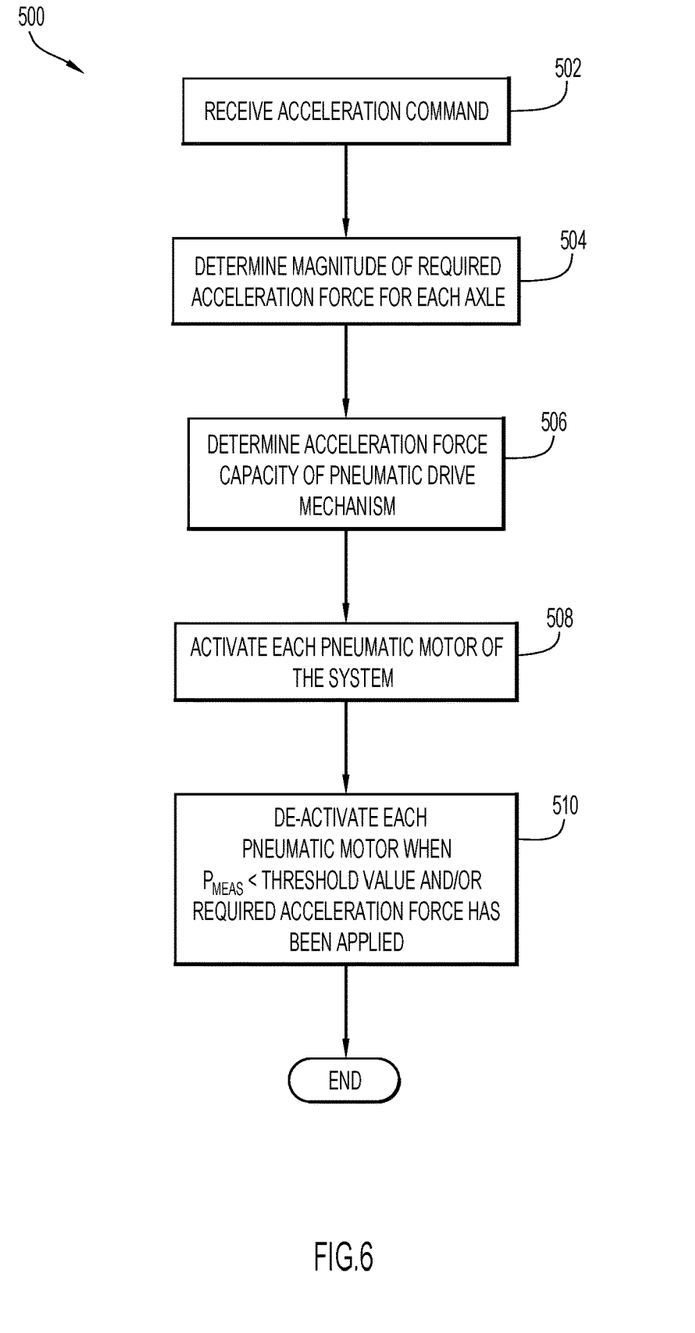
FIG. 6 is flow chart of a method of utilizing the hybrid pneumatic regenerative system FIG. 1 during an acceleration operation of a railway vehicle in accordance with the second exemplary embodiment of the invention illustrated in FIG. 4.

FIG. 5 describes a braking process 400 of the system 150. A braking command is initiated by the user/operator of the railway vehicle 100 by actuating the brake actuator of the railway vehicle 100 (shown generally as box 350 in FIG. 4). The controller 346 of each mechanism 300 of the system 150, which is in communication with the brake actuator sensors, receives the braking command (step 402) and determines the magnitude of the brake force required (e.g., based upon the amount or degree of displacement of the brake pedal by the user/operator) (step 404).

The controller 346 of each mechanism 300 of the system 150 next determines the brake force capacity that can be provided by each of the respective mechanisms 300 of the system 150 (step 406). In particular, when the compressors 312 are activated, by coupling the electromechanical clutches 314 with the drive shafts 302 via the transfer cases 310, at least some of the rotational power of each drive shaft 302 is transferred as kinetic energy, through its connected transfer case 310, clutch 314, and CVT 316, to operate the compressor 312 to which each drive shaft 302 is coupled. The transfer of kinetic energy by each transfer case 310, clutch 314, and CVT 316 of each mechanism 300 results in a "drag" on each one of the drive shafts 302, which, in turn, imparts that "drag" onto each one of the axles 306 to which the mechanisms 300 are coupled. This "drag" imparted onto the axles 306 of the railway vehicle 100 reduces the speed or velocity of the railway vehicle 100. Each controller 346 determines, based upon the amount of pressurized air that is already in the accumulator 324 of its mechanism 300 (e.g., by measuring the pressure and/or any other conditions within the accumulator 324 and/or the conduit 332 via the sensors 348 disposed at such locations) and thus to what extent the compressor 312 of each mechanism 300 needs to operate, the magnitude of the brake force capacity (e.g., the amount of "drag" that can be applied to each of the drive shafts 302) that results from operation of the compressor 312 of its mechanism 300. The remaining or excess braking force that is required to achieve the required braking force is provided by the main braking system (e.g., a disk brake system) for the railway vehicle 100. Control of the amount of force applied by the main braking system can be achieved in any number of conventional or other ways (e.g., for a hydraulic braking system, by controlling the pressure of the hydraulic portion that applies a force to the mechanical/frictional portion of the braking system).

In an exemplary embodiment, the control logic of each controller 346 may allow operation of its associated compressor 312 only to the extent that a maximum pressure ($P_{max}$) is achieved within its associated accumulator 324. Operation of each compressor 312 is initiated and maintained during a braking cycle of operation of the railway vehicle 100 (i.e., based upon a brake command by the user/operator pressing on the brake pedal of the vehicle 100) only to the extent that the measured pressure within the accumulator 324 is no greater than the maximum pressure ($P_{meas} \leq P_{max}$). In another exemplary embodiment, the controller 346 may continuously operate each compressor 312 to supply pressurized air to its associated accumulator 324 during the braking operation. However, the pressure within each accumulator 324 can be controlled so as to not exceed the maximum pressure ($P_{max}$) by bleeding air from each accumulator 324 (e.g., via the relieve valve 330) or from each air conduit 332 (e.g., via an electromechanical valve disposed along the air conduit 332 that can be selectively controlled by each controller 346 associated with each accumulator 324 to bleed air from the pneumatic drive portion when the pressure approaches $P_{max}$).

Each controller 346 of each mechanism 300 of the system 150 may be configured to communicate with one another controller of another mechanism 300, or with one central controller (not shown). Thus, after determining the brake force capacity of each pneumatic drive mechanism 300, the controller 346 of each mechanism initiates a braking operation for the axle of the railway vehicle 100 to which it is coupled by activating its associated air compressor 312 (step 408). In particular, for each mechanism 300 performing a braking operation, the controller 346 activates the clutch 314 so as to couple the drive shaft of the compressor 312, via the CVT 316, clutch 314 and transfer case 310, with the drive shaft 302. The main braking system is also actuated, as necessary (e.g., when it is determined that the required braking force exceeds the braking capacity of each pneumatic drive mechanism 300 of the system 150). For each mechanism 300, the kinetic energy from the rotation of the drive shaft 302 is transferred from the transfer case 310 and via the clutch 314 and CVT 316 to the drive shaft of the compressor 312. This results in pressurized air being supplied to the accumulator 324 and also a deceleration or reduction in velocity of the axle 306 of the railway vehicle 100.

Through communication with the other mechanisms 300, each of the mechanisms 300 of the system 150 may simultaneously deliver a braking operation to their respective axles 306 of the railway vehicle 100. However, in some instances, the accumulator 324 of one mechanism 300 may be more or less full than that of another mechanism 300. In other instances, the braking force required by some mechanisms 300 may differ from that of other mechanism 300 (e.g., mechanisms equipped on a larger/heavier car 110, 120, 130 of the railway vehicle 100). Thus, while each of the mechanisms 300 may be configured to deliver a braking operation concurrently with the other mechanisms 300, the braking force applied by each mechanism 300 may differ from that applied by the other mechanisms 300.

The controller 346 of each mechanism 300, or the central controller of the system 150, determines whether a sufficient brake force has been applied to each axle 306 of the railway vehicle 100 as a result of actuation of the compressor 312 of each mechanism and/or the main braking system of the vehicle 100 (step 410). Each axle 306 may be separately evaluated to determine if the sufficient brake force has been applied. If the required brake force has been fully applied for an axle, the compressor 312 (if still operating) coupled to that axle is deactivated (step 418) along with the main braking system, as necessary, and the braking operation ends. The air compressor 312 of each mechanism 300 is deactivated by decoupling the associated clutch 314 with the associated drive shaft 302.

If the required braking force has not yet been fully applied, however, the controller 346 of each mechanism 300 monitors the pressure within the accumulator 324 of that mechanism 300 (step 412). If the pressure within the accumulator 324 is less than the maximum allowed pressure ($P_{meas} < P_{max}$), the controller 346 associated with that accumulator 324 re-activates or maintains activation of the associated compressor 312 (step 414), and the control logic proceeds back to step 410. If the measured pressure within the accumulator 324 of a mechanism 300 is not less than the maximum allowed pressure, the associated air compressor 312 is deactivated (step 416), and the control logic proceeds back to step 410. In an alternative embodiment, as noted above, the air compressor 312 of each mechanism 300 can continue to operate during the entire braking operation, where the controller 346 of each mechanism 300 monitors the pressure within the associated accumulator 324 and bleeds the accumulator 324 as necessary (e.g., when $P_{meas}$ approaches $P_{max}$).

Thus, during the braking operation 400, when each axle of the railway vehicle 100 is equipped with the hybrid pneumatic drive mechanism 300, the energy that would otherwise be lost from each axle 306 of the railway vehicle 100 is recaptured to some extent by each mechanism 300 of the system 150, which pressurizes air and stores the pressurized air within the accumulator 324 of each mechanism 300 for use during an acceleration operation.

The acceleration operation 500 of the system 150 to propel the railway vehicle 100 from a stopped or zero velocity state to an accelerated/moving state is now described with reference to the flowchart of FIG. 6. When the user/operator of the railway vehicle 100 initiates an acceleration command by actuating the accelerator actuator (indicated generally as box 350 in FIG. 4), the displacement sensor(s) associated with the accelerator actuator provide the command to the controller 346 (step 502) of each mechanism 300 of the system 150, where the degree of acceleration to be applied by the system 150 is determined by the controller 346 of each mechanism 300 based upon the sensor measurements. Each controller 346 determines the magnitude of the acceleration force required (step 504) for the axle 306 to which its associated mechanism 300 is coupled based upon the displacement sensor information. Each controller 346 also determines the capacity of the acceleration force that can be provided by its associated mechanism 300 of the system 150 (step 506) based upon the known amount of pressurized air within its associated accumulator 324 (e.g., based upon pressure measurements and any other types of sensor measurements, such as temperature measurements, measured within the accumulator 324 and/or within the air conduit 332). Each controller 346 activates its associated pneumatic motor 334 based upon the acceleration force requirements (step 508). In the event that the mechanism 300 is equipped on one of the drive axles 306 of the locomotive car 110, then the controller 346 activates its associated pneumatic motor 334 and the main drive mechanism 119 based on the acceleration force requirements. If it is determined that the pneumatic motor 334 of a mechanism 300 can contribute to the acceleration requirements based upon the amount of pressurized air within the accumulator 324 associated with that same mechanism 300, then the pneumatic motor 334 is activated to drive rotation of the axle 306. However, if it is determined that there is an insufficient amount of pressurized air necessary to operate the pneumatic motor 334 to meet the acceleration requirements, the pneumatic motor 334 is not activated. If there is an insufficient amount of pressurized air within an accumulator 324 of a mechanism coupled to a drive axle of the locomotive 110, then the main drive mechanism 119 supplies all of the power to rotate the drive axles. If there is an insufficient amount of pressurized air within an accumulator 324 of a mechanism coupled to a non-drive axle of the railway vehicle 100, such as that of rail cars 120, 130, than no power is delivered to those axles of the rail cars 120, 130.

For each mechanism 300, the controller 346 activates its associated pneumatic motor 334 (step 508) by opening the electromechanical valve 336 to force pressurized air from the accumulator 324 through the air conduit 332 and to the inlet of the pneumatic motor 334. The pressure of the air is also regulated by the regulator 338, which is selectively controlled by the controller 346. The pressurized air flows through the air conduit 332 to the inlet of the pneumatic motor 334, where it expands within the motor 334 and causes the drive shaft of the motor 334 to rotate. The one way or sprag clutch 340 connected with the rotating drive shaft of the pneumatic motor 334 couples, via the transfer case 310, with the drive shaft 302, delivering accelerating power to the axle 306 with which the mechanism 300 is coupled. The expanded air exits the pneumatic motor 334 through the exhaust conduit 342 and muffler 344, where it is vented to the environment surrounding the railway vehicle 100.

For the locomotive car 110, when both the pneumatic motors 334 coupled to each axle and the main drive mechanism 119 are activated, they can cooperatively operate in parallel to provide power to the axles of the locomotive car 110 of the railway vehicle 100. In other words, both the pneumatic motors 334 of the mechanisms 300 coupled to the axles of the locomotive car 110 and main drive mechanism 119 of the locomotive car 110 can operate together, where the pneumatic motors 334 cease operation when their pressurized air supply from their associated accumulators 324 are sufficiently depleted. Alternatively, the system 150 can be designed to operate in series, where the pneumatic motors 334 of the mechanisms 300 can be activated first and operated until the energy of each mechanism 300 is depleted or exhausted (i.e., the pressurized air is sufficiently depleted within the accumulator 324 of each mechanism 300), followed by activation of the main drive mechanism 119. In addition, for the rail cars 120, 130, which do not include a main drive mechanism 119, the system 150 can be designed to operate the pneumatic motors 334 of the mechanisms 300 until the energy of each mechanism 300 is depleted or exhausted (i.e., the pressurized air is sufficiently depleted within the accumulator 324 of each mechanism 300). Once the energy of each mechanism 300 is depleted, the pneumatic motors 324 of each of these mechanisms no longer provides rotation of the axles of the rail cars 120, 130, where the velocity of the rail cars 120, 130 is derived from the pulling force applied to the rail cars 120, 130 by the locomotive car 110 and the main drive mechanism 119 of the locomotive car 110.

The controller 346 of each mechanism 300 deactivates its associated pneumatic motor 334 (by closing the associated electromechanical valve 336) when it is determined that the pressurized air supply is sufficiently depleted (e.g., when a measured pressure within the pneumatic drive portion, $P_{meas}$, is below a minimum or threshold value) and/or when the required acceleration force has been applied to the axle 306 in which each mechanism 300 is coupled (step 510).

Thus, the system 150 facilitates "charging" of each accumulator 324 of each mechanism 300 with pressurized air during a braking operation 400 of the railway vehicle 100, so as to capture some of the braking energy from the axles 306, with subsequent use of the captured energy during an acceleration operation 500 of the railway vehicle 100. A continuous cycle of braking and acceleration operations 400, 500 when utilizing the railway vehicle 100 results in a reduction of the energy requirements for the main drive mechanism 119 of the locomotive car 110 of the railway vehicle 100.

As previously noted, the hybrid pneumatic drive systems and corresponding methods described above can be utilized with any types, makes or models of railway vehicles.

The system of the present invention does not require an electric battery, which are incapable of providing or storing the necessary power to drive the axles of a railway vehicle, or hydraulic fluid, which are associated with endurance, environmental, economic, weight, and maintenance concerns. In addition, the pneumatic drive portion of the system of the present invention is an open system in that the "working fluid" (i.e., air) is obtained (drawn in) from the surrounding environment in which the motorized vehicle is operated and is further exhausted after being used.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed:

1. A pneumatic regenerative system for a railway vehicle, the railway vehicle including a locomotive with a main drive mechanism, and the railway vehicle including plurality of axles that rotate when the railway vehicle is propelled along a railway, the system comprising:
a plurality of pneumatic drive mechanisms, each pneumatic drive mechanism mechanically coupled to one of the plurality of axles of the railway vehicle, one of the plurality of pneumatic drive mechanisms being coupled to a one of the plurality of axles of the railway vehicle which is not mechanically driven by the main drive mechanism of the locomotive, each pneumatic drive mechanism comprising:
an accumulator that is operable to receive and store pressurized air; and
a pneumatic device operably coupled to one of the plurality of axles and the accumulator, the device operable in a first configuration, where the device is driven by rotation of the one of the plurality of axles during a braking operation of the railway vehicle to generate and store pressurized air in the accumulator, and a second configuration, where the pneumatic device receives pressurized air from the accumulator to drive rotation of the one of the plurality of axles during an acceleration operation of the railway vehicle.

2. The system of claim 1, wherein each pneumatic drive mechanism further comprises:
a controller that selectively configures the pneumatic device to operate in the first configuration during the braking operation of the railway vehicle and the second configuration during the acceleration operation of the railway vehicle.

3. The system of claim 2, wherein the controller is configured to deactivate the pneumatic device during the braking operation when a measured pressure within the accumulator reaches or exceeds a maximum value.

4. The system of claim 1, wherein each pneumatic drive mechanism further comprises:
a heat exchanger disposed between the pneumatic device and the accumulator, where the heat exchanger is in fluid communication with the pneumatic device and the accumulator.

5. The system of claim 4, wherein each pneumatic drive mechanism further comprises:
a heat storage apparatus coupled to the heat exchanger, where the heat storage apparatus is in thermal communication with the heat exchanger.

6. The system of claim 5, wherein the heat storage apparatus includes a tank filled with a liquid.

7. The system of claim 5, wherein, when the pneumatic device operates in the first configuration, the heat exchanger extracts heat from the pressurized air prior to the pneumatic device storing the pressurized air in the accumulator, the heat exchanger storing the extracted heat in the heat storage apparatus.

8. The system of claim 5, wherein, when the pneumatic device operates in the second configuration, the heat exchanger introduces heat from the heat storage apparatus to the pressurized air prior to the pneumatic device utilizing the pressurized air from the accumulator to drive rotation of one of the plurality of axles.

9. The system of claim 1, wherein air is input into the pneumatic device from an environment in which the railway vehicle operates when operated in the first configuration, and air expanded within the pneumatic device is exhausted to the environment when operated in the second configuration.

10. The system of claim 1, wherein the locomotive includes a plurality of axles, each of the pneumatic drive mechanisms disposed on the locomotive being mechanically coupled to one of the plurality of axles of the locomotive.

11. The system of claim 10, wherein the pneumatic drive mechanisms and the main drive mechanism, when operating in the second configuration, separately and independently provide energy to the each of the plurality of axles of the locomotive during the acceleration operation.

12. The system of claim 1, wherein
the accumulator is an air storage apparatus configured to store compressed air, and
the pneumatic device is a reversible pneumatic device in fluid communication with the air storage apparatus, the reversible pneumatic device operable as an air compressor during the braking operation of the railway vehicle, where the reversible pneumatic device stores air within the air storage apparatus, and the reversible pneumatic device operable as an air motor during the acceleration operation of the railway vehicle, where the reversible pneumatic device draws and expands pressurized air from the air storage apparatus.

13. The system of claim 12, wherein rotation of the plurality of axles during the braking operation of the railway vehicle causes the reversible pneumatic device of each pneumatic drive mechanism to store compressed air within the air storage apparatus.

14. The system of claim 12, wherein the reversible pneumatic device of each pneumatic drive mechanism utilizes the compressed air within the air storage apparatus to drive the reversible pneumatic device and drive rotation of the plurality of axles during the acceleration operation of the railway vehicle.

15. The system of claim 12, wherein each pneumatic drive mechanism further comprises:
a transfer case coupling the reversible pneumatic device to the one of the plurality of axles.

16. The system of claim 15, wherein the transfer case includes a continuously variable transmission.

17. The system of claim 16, wherein each pneumatic drive mechanism further comprises:
a controller coupled to the transfer case and the reversible pneumatic device, the controller controlling the continuously variable transmission to optimize operation of the reversible pneumatic device during the braking operation of the railway vehicle and optimize rotation of the one of the plurality of axles during the acceleration operation of the railway vehicle.

18. The system of claim 1, wherein the pneumatic device further comprises:
an air compressor that is operably coupled to one of the plurality of axles so as to activate the air compressor and generate pressurized air during the braking operation of the railway vehicle, wherein the
accumulator receives and stores the pressurized air from the air compressor during the braking operation of the railway vehicle; and
a pneumatic motor that receives the pressurized air from the accumulator to activate the pneumatic motor such that, during activation, the pneumatic motor provides energy to the one of the plurality of axles during the acceleration operation of the railway vehicle.

19. The system of claim 18, wherein each pneumatic drive mechanism further comprises:
a controller that selectively couples the air compressor with the one of the plurality of the axles during the braking operation of the railway vehicle and selectively activates the pneumatic motor during the acceleration operation of the railway vehicle.

20. The system of claim 18, wherein air is input into the air compressor from an environment in which the railway vehicle operates, and air expanded within the pneumatic motor is exhausted to the environment.

* * * * *